United States Patent
Probst et al.

(10) Patent No.: US 6,962,953 B2
(45) Date of Patent: Nov. 8, 2005

(54) AQUEOUS SECONDARY DISPERSIONS

(75) Inventors: Joachim Probst, Leverkusen (DE);
Martin Melchiors, Leichlingen (DE);
Wieland Hovestadt, Leichlingen (DE);
Michael Sonntag, Leverkusen (DE);
Burkhard Köhler, Leverkusen (DE);
Bernhard Jansen, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 556 days.

(21) Appl. No.: 10/174,034

(22) Filed: Jun. 18, 2002

(65) Prior Publication Data

US 2003/0050385 A1 Mar. 13, 2003

(30) Foreign Application Priority Data

Jun. 21, 2001 (DE) .......................... 101 29 854

(51) Int. Cl.$^7$ ............ C08F 2/00; C08L 33/14; C08L 47/10
(52) U.S. Cl. ............ 524/505; 524/556; 524/817; 524/831; 525/93; 526/203; 428/500
(58) Field of Search ................. 524/817, 831, 524/505, 556; 525/93; 526/203

(56) References Cited

U.S. PATENT DOCUMENTS

| | | | |
|---|---|---|---|
| 4,522,968 A | 6/1985 | Horacek | 524/388 |
| 5,075,370 A | 12/1991 | Kubitza et al. | 524/591 |
| 5,180,425 A | 1/1993 | Matrick et al. | 106/22 R |
| 5,484,851 A | 1/1996 | Fock | 525/333.5 |
| 5,541,261 A | 7/1996 | Fock et al. | 525/299 |
| 6,251,985 B1 | 6/2001 | Wamprecht et al. | 524/539 |
| 6,376,602 B1 | 4/2002 | Probst et al. | 524/591 |
| 6,399,691 B1 | 6/2002 | Melchiors et al. | 524/457 |
| 2001/0056154 A1 | 12/2001 | Blum et al. | 524/522 |

FOREIGN PATENT DOCUMENTS

| | | |
|---|---|---|
| CA | 2088217 | 7/1993 |
| DE | 195 30 522 | 4/1997 |
| DE | 197 04 714 | 7/1997 |
| DE | 198 10 051 | 4/1999 |
| EP | 046 190 | 2/1982 |
| EP | 118 009 | 9/1984 |
| EP | 0 118 009 | 9/1984 |
| EP | 238 863 | 9/1987 |
| EP | 0 238 863 | 9/1987 |
| EP | 288 763 | 11/1988 |
| EP | 0 288 763 | 11/1988 |
| EP | 781 819 | 7/1997 |
| EP | 783 023 | 7/1997 |
| EP | 841 352 | 5/1998 |
| EP | 0 841 352 | 5/1998 |
| EP | 879 858 | 11/1998 |
| GB | 1104403 | 2/1968 |
| WO | 02/32563 | 4/2002 |

*Primary Examiner*—Tae H. Yoon
(74) *Attorney, Agent, or Firm*—Joseph C. Gil; Thomas W. Roy

(57) ABSTRACT

The present invention relates to heat and storage stable vinyl polymer polyol secondary dispersions containing
A) at least one vinyl polymer resin having functional groups selected from hydroxyl, carboxyl and/or sulfonic acid groups and dispersed in a water/solvent mixture in the presence of a neutralizing agent, and
B) at least one amphiphilic polymer built up from a hydrophobic and a hydrophilic segment.

The invention also relates to a process for the preparation of the vinyl polymer polyol secondary dispersions by preparing vinyl polymer resin A) by polymerizing a mixture of ethylenically unsaturated monomers a) in the presence of an initiator b) in a water/solvent mixture and adding at least one amphiphilic polymer B), then at least partly neutralizing and dispersing the resulting product, optionally after the addition of a further amount of water.

11 Claims, No Drawings

AQUEOUS SECONDARY DISPERSIONS

FIELD OF THE INVENTION

The present invention relates to new vinyl polymer secondary dispersions with a high heat stability and low cosolvent content, a process for their preparation and their use in coating compositions.

BACKGROUND OF THE INVENTION

A suitable process for the preparation of storage stable poly(meth)acrylate secondary dispersions for binders or binder components in water-dilutable coating compositions has been described in EP-A 0 841 352. In that specification a mixture of ethylenically unsaturated monomers is polymerized in a mixture of organic solvents, initiator and water. The polyacrylate resin obtained is then at least partly neutralized and dispersed in water.

A disadvantage of the process described in EP-A 0 841 352 is that the resulting aqueous/organic dispersions are not sufficiently heat stable. The dispersions have inadequate heat stability because they are unstable if they are stored at elevated temperatures of 40° C. and above. This is apparent in particular if non-polar, poorly water-soluble cosolvents, e.g., a mixture of alkylated aromatics (such as Solvesso 100 solvent) are employed or the cosolvent/water ratio initially employed in the feed polymerization is kept below a weight ratio of 40/60.

Other preparation processes for secondary dispersions include so-called "two-pot processes", wherein the polymerization is carried out in a homogeneous organic medium in a first tank and the resulting product is dispersed in an aqueous phase with prior or simultaneous neutralization, e.g. by means of amines, in a second tank. Such processes are described, for example, in EP-A 358 979, DE-A 198 14 061 and EP-A 1 024 184. These two-pot processes are expensive in technical terms because two autoclaves are required for the preparation of the dispersions and the transfer of the usually highly viscous polymer solution into the dispersing tank presents complications. Furthermore, in the initial stage of the polymerization there may also be problems with temperature regulation and stirring of the batch because of the small amount of solvent in the initial polymerization mixture due to the process technology. The addition of another dispersing medium, in general water, with the organic solvent is therefore necessary.

An object of the present invention is to provide heat stable vinyl polymer secondary dispersions which do not have the disadvantages described by the prior art and which are prepared by a process which is less expensive in technical terms. The storage stable secondary dispersions should also be suitable as coating compositions for practically any desired substrates, but in particular for metallic substrates.

These objects may be achieved with the polymer dispersions of the present invention. It has now been found that an adequate heat stability can be achieved in vinyl polymer secondary dispersions by the presence of suitable amphiphilic oligomers or polymers with a block or graft structure. The polymerization, which proceeds as a multiphase reaction in the cosolvent/water mixture and in the presence of the amphiphilic compounds, results in polyol dispersions that are storage stable even at temperatures above 40° C. The amphiphilic compounds act as stabilizing surfactants both during the polymerization and during the storage of the completely polymerized dispersions.

SUMMARY OF THE INVENTION

The present invention relates to heat and storage stable vinyl polymer polyol secondary dispersions containing A) at least one vinyl polymer resin having functional groups selected from hydroxyl, carboxyl and/or sulfonic acid groups and dispersed in a water/solvent mixture in the presence of a neutralizing agent, and
B) at least one amphiphilic polymer built up from a hydrophobic and a hydrophilic segment.

The invention also relates to a process for the preparation of the vinyl polymer polyol secondary dispersions by preparing vinyl polymer resin A) by polymerizing a mixture of ethylenically unsaturated monomers a) in the presence of an initiator b) in a water/solvent mixture and adding at least one amphiphilic polymer B), then at least partly neutralizing and dispersing the resulting product, optionally after the addition of a further amount of water.

DETAILED DESCRIPTION OF THE INVENTION

The soluble polymer content of the vinyl polymer polyol secondary dispersions according to the invention preferably has a number average molecular weight, $M_n$, of 1,000 to 20,000 g/mol and a weight average molecular weight, $M_w$, of 5,000 to 100,000 g/mol (measured against polystyrene calibration standards). The glass transition temperatures, which are measured by the DSC method, are in preferably 0 to 60° C., more preferably 0 to 50° C.

The vinyl polymer-polyol secondary dispersions according to the invention have a hydroxyl number of 15 to 200, preferably 30 to 180 mg KOH/g of solid. The acid number is 4 to 55, preferably 8 to 55, more preferably 12 to 40 mg KOH/g of solid. The dispersions according to the invention have average particle sizes of 50 to 250 nm and solids contents of 30 to 60 wt. %, preferably 35 to 55 wt. %, and viscosities of 100 to 10,000 mPa·s, preferably 300 to 5,000 mPa·s (23° C., shear gradient D=42 $s^{-1}$). The pH values of the dispersions according to the invention are preferably 5 to 11, more preferably 6 to 10, and most preferably 6.5 to 9.

Preferably, in the process according to the invention, 30 to 80 wt. %, preferably 35 to 75 wt. %, of a mixture of ethylenically unsaturated monomers a); 0.5 to 8.0 wt. % of an initiator b) in a mixture of 2 to 20 wt. %, preferably 5 to 15 wt. %, of an organic solvent c); and 10 to 50 wt. %, preferably 15 to 40 wt. %, of water d) are polymerized with the addition of 0.1 to 3.0 wt. %, preferably 0.15 to 2.0 wt. % of an amphiphilic polymer B), wherein the sum of the components is 100 wt. %.

The initiator b) employed in the process according to the invention should preferably be soluble in the organic solvent c), and the amphiphilic polymer B) should preferably be soluble or dispersible in the mixture of c) and d).

Monomers a) include mixtures of mono-ethylenically unsaturated monomers, such as acrylic acid or methacrylic acid alkyl esters or cycloalkyl esters having 1 to 18 carbon atoms in the alkyl or cycloalkyl radical. Examples include methyl, ethyl, n-propyl, n-butyl, isopropyl, isobutyl, t-butyl, the isomeric pentyl, hexyl, 2-ethylhexyl, octyl, dodecyl, hexadecyl, octadecyl, cyclohexyl, trimethylcyclohexyl or isobornyl esters of the acids mentioned. Also suitable are acetoacetoxyethyl methacrylate, acrylonitrile, vinyl ether, methacrylonitrile, vinyl acetate, styrene and vinyltoluene.

Ethylenically unsaturated monomers having alcoholic hydroxyl groups are also used. Examples include hydroxyalkyl esters of α,β-unsaturated carboxylic acids, in particular of acrylic acid or methacrylic acid, having 2 to 12, preferably 2 to 6 carbon atoms in the hydroxyalkyl radical, such as 2-hydroxyethyl (meth)acrylate, the isomeric hydroxypropyl (meth)acrylates obtained by addition of 1 mole of propylene oxide onto 1 mole of (meth)acrylic acid, 2-, 3- and 4-hydroxybutyl (meth)acrylate and the isomeric hydroxyhexyl (meth)acrylates. Hydroxy-functional monomers which have been modified or chain-lengthened with ethylene oxide, propylene oxide and/or butylene oxide and have a number average molecular weight of up to 3,000 g/mol are also suitable. The monomers having alcoholic hydroxyl groups are employed in mixture A) in an amount such that the OH number of the polyacrylate secondary dispersion is 15 to 200, preferably 30 to 180 mg KOH/g of solid.

Unsaturated monomers having carboxyl groups, such as acrylic acid, methacrylic acid, maleic acid, itaconic acid, crotonic acid and half-esters of maleic and fumaric acid, preferably acrylic acid or methacrylic acid, can also be used in mixture a). The monomers containing carboxyl groups are employed in an amount sufficient to obtain an acid number of the polyacrylate secondary dispersion of 4 to 55, preferably 8 to 55, and more preferably 12 to 40 mg KOH/g of solid. Monomers containing sulfonic acid groups, such as styrenesulfonic acid and 2-acrylamido-2-methylpropanesulfonic acid, can also be used. The use of monomers containing carboxyl groups is preferred.

The ionic groups of the vinyl polymer resin A) are primarily used, after their neutralization, to stabilize the aqueous/organic dispersion and as catalysts for the reaction between the isocyanate groups of polyisocyanate crosslinking agents and the hydroxyl groups of the polyol, and for better dispersing of pigments. The non-neutralized carboxylic acid and sulfonic acid groups are moreover capable of reacting with the isocyanate groups of the polyisocyanate crosslinking agent to give amide structures, while carbon dioxide is split off.

Suitable initiators b) include initiators which are soluble in the organic solvent c). Preferred examples include organic peroxides, such as dibenzoyl peroxide, tert-butyl peroxypivalate, tert-butyl peroxy-2-ethylhexanoate, di-tert-butyl peroxide, didecanoyl peroxide, tert-butyl peroxybenzoate and dicumyl peroxide; and azo compounds such as azodiisobutyric acid nitrile. Tert-butyl peroxy-2-ethylhexanoate, tert-butyl peroxybenzoate or di-tert-butyl peroxide are more preferred.

To achieve the desired molecular weight, regulators, such as n-dodecylmercaptan, t-dodecylmercaptan or mercaptoethanol, can be used in amounts of up to 1 wt. %.

Suitable amphiphilic polymers B) are those polymers which have both hydrophilic and lipophilic properties and in which the hydrophilic and the lipophilic molecular segments are present separately from one another in the same molecule. A block-like or comb-like (graft-like) structure is preferred.

Any polymer of a water-insoluble or poorly soluble monomer is suitable as the lipophilic, water-insoluble molecular part of the amphiphilic substance. The degree of polymerization of this molecular constituent is at least 2.

Nonionically, anionically as well as cationically charged molecular parts can function as the hydrophilic, water-soluble constituent of the amphiphilic substance. Anionically and nonionically modified polymer species are preferred.

Examples include block polymers of ethylenically unsaturated, poorly water-soluble monomers and ethylene oxide sequences which are readily water-soluble, such as e.g. block polymers of polystyrene and polyethylene oxide, block polymers of polymethyl methacrylate and polyethylene oxide and block polymers of polybutyl methacrylate and polyethylene oxide. These products are marketed, e.g., as test products $SE_{xy}$, $ME_{xy}$ and $BE_{xy}$ by Th. Goldschmidt AG, Essen, where x and y contain the molecular weight data for the individual molecular blocks. The preparation of polymethacrylate/polyethylene oxide block polymers is described in EP-A 0 613 910.

Amphiphilic block polymers which are formed by coupling a hydrophobic (meth)acrylate block having a terminal OH group and a hydrophilic polyethylene oxide block having likewise a terminal OH group via a diisocyanate are also possible. The preferred molecular weights $M_n$ of the lipophilic blocks of these block polymers are between 500 and 5,000 g/mol, and those of the hydrophilic ethylene oxide blocks are between 1,000 and 6,000 g/mol.

Block polymers of a butylene/ethylene block as the hydrophobic block and polyethylene oxide as the hydrophilic block are also suitable. An example of a block polymer is marketed by Tego Chemie Service, Essen under the name Tego EBE 55x.

Block polymers of a hydrophobic vinyl polymer block and a hydrophilic block with anionic groups, such as carboxylic acid groups, are also suitable. An example is an amphiphilic block polymer from Th. Goldschmidt, Essen with the name Block Polymer VP MA 1007, which is a hydrophobic methyl methacrylate block with a molecular weight of 1,000 g/mol and a hydrophilic methacrylic acid block with a molecular weight of 700 g/mol.

Block polymers of a hydrophobic polypropylene oxide block and a hydrophilic polyethylene oxide block are also suitable, as are also those amphiphilic polymers with a multiblock structure. Examples of these are block polymers from ICI Surfactants, Great Britain with the name Synperonic PE. They have compositions of 5 to 80% ethylene oxide and molecular weights of up to 15,000 g/mol.

Amphiphilic polymers B) which are a block polymer of a vinyl polymer as the hydrophobic block and polyethylene oxide as the hydrophilic block are preferred. Block polymers of a vinyl polymer as the hydrophobic block and poly(meth)acrylic acid as the hydrophilic block are also preferred.

Suitable solvents c) include alcohols such as n-butanol, n-pentanol, n-hexanol, cyclohexanol, heptanol, methyl glycol, ethyl glycol, butyl glycol, methoxypropanol, ethoxypropanol, butoxypropanol, 1-t-butoxy-2-propanol, methyl diglycol, ethyl diglycol, butyl diglycol, glycolic acid methyl ester, glycolic acid ethyl ester, glycolic acid butyl ester, lactic acid methyl ester, lactic acid ethyl ester, lactic acid butyl ester and mixtures of these and other solvents, such as N-methylpyrrolidone, solvent naphtha, ethylene carbonate, butyl acetate, xylene, toluene, cyclohexane, diacetone alcohol, methyl isobutyl ketone and acetone, and mixtures thereof.

Solvents c) which have an amphiphilic character are preferred. The lipophilic molecular part contains a hydrocarbon radical having at least 4 C atoms and the hydrophilic molecular part contains an oligoethylene glycol or an oligopropylene glycol unit with a minimum degree of polymerization of 1. Butyl glycol, butoxypropanol, 1-t-butoxy-2-propanol, butyl diglycol or mixtures of these solvents are particularly preferred.

The copolymerization in the process according to the invention is preferably carried out at a temperature of 80 to 180° C., more preferably 100 to 170° C. and most preferably 110 to 160° C. in the feed process. It can be carried out either under normal pressure or in a closed tank under pressure.

In general, solvent c) and water d) are initially introduced into the reaction tank together with amphiphilic polymer B) and the mixture is heated to the polymerization temperature, while stirring.

Monomer mixture a) and initiator component b), preferably dissolved in a portion of the solvent component c), are metered into the initial reaction mixture in parallel over a period of 1 to 10 hours, preferably 2 to 6 hours. After the end of the metering of the monomers and initiator, a small amount of initiator can be subsequently metered in, to lower the residual monomer content in the polymerization batch.

It is possible to carry out the copolymerization in the process according to the invention in several stages in a manner in which monomer mixture a) is divided into several portions of different composition, which are polymerized in succession. After the end of the copolymerization the content of residual monomers in the polymerization batch is as a rule less than 0.1 wt. %.

The polymerization can be carried out in two stages in which a hydrophobic, water-insoluble monomer mixture is first polymerized, and then a hydrophilic monomer mixture is polymerized. It is also possibe, in a reverse process, to first polymerize a hydrophilic monomer mixture and then polymerize a hydrophobic, water-insoluble monomer mixture. The "direct" process mentioned first is preferred.

The acid groups are neutralized by inorganic bases, such as lithium hydroxide, sodium hydroxide or potassium hydroxide, or by ammonia or organic amines. Organic amines are preferred and include N-methylmorpholine, trimethylamine, triethylamine, methyldiisopropylamine, tripropylamine, tributylamine, dimethylcyclohexylamine, diethanolamine, triethanolamine, dimethylisopropanolamine, methyldiethanolamine, diethylethanolamine, dimethylethanolamine, butanolamine, dibutanolamine, ethanolamine, ethylamine, morpholine and mixtures of these neutralizing agents, optionally with other, including higher molecular weight, amines containing ether or ester groups. Ammonia, triethylamine, triethanolamine and dimethylethanolamine are particularly preferred.

In the aqueous copolymer dispersion, at least 40% of the neutralizable carboxyl or sulfonic acid groups are neutralized by salt formation, preferably 70 to 100%. It is also possible for an excess of neutralizing agent to be present. Neutralization with a primary or a secondary amine may be advantageous, since incorporation into the polyurethane network can take place. The same applies to the use of tertiary amines which additionally contain further isocyanate-reactive groups, such as e.g. OH groups. The neutralizing agent can be added by itself or together with the water to be optionally added.

The amount of water to be optionally added is preferably chosen such that after dispersing the polymerization batch the solids content of the dispersion is between 30 and 60 wt. %, preferably between 35 and 55 wt. %, and the viscosity of the dispersion is 100 to 10,000, preferably 300 to 5,000 mPa·s (23° C., shear gradient D=42 s$^{-1}$). The water can be added to the polymerization batch or the polymerization batch can be added to the water.

Additives C) include the additives known in coating technology, such as defoamers, thickeners and flow control agents, catalysts, dispersing aids, anti-skinning agents, anti-sedimentation agents, siccatives and emulsifiers.

The invention also provides the use of the vinyl polymer polyol secondary dispersions according to the invention as binders or binder components in water-dilutable coating compositions. These coating compositions are employed as primers, fillers, pigmented or transparent top coats, clear coatings and high-gloss coatings, as well as one-coat lacquers in individual and series application, e.g. in industrial lacquering and car original coatings and repair coatings.

The invention also provides coating compositions containing the vinyl polymer polyol secondary dispersions according to the invention, crosslinking agents, optionally pigments and optionally the additives known from coatings technology.

Suitable crosslinking resins are the conventional crosslinking resins known from coatings technology which can react with hydroxyl groups at room temperature or elevated temperature, such as phenolic resins, melamine resins and blocked or non-blocked polyisocyanates. Mixtures of various crosslinking resins can also be employed. The use of blocked and/or non-blocked polyisocyanates is preferred.

The coating compositions according to the invention are suitable for all fields of use in which water-dilutable coating systems with an increased profile of properties, such as outstanding optical properties (degree of gloss, haze value and film flow), are used. Suitable substrates which can be coated or sealed with the coating compositions according to the invention include mineral building material surfaces, wood and derived timber products, metallic surfaces, bitumen- or asphalt-containing coverings, various plastic surfaces and high-gloss lacquers. Metallic surfaces or plastic surfaces are preferred as substrates.

The copolymers according to the invention present as a dispersion and/or solution in water are preferably employed in combination with non-blocked polyisocyanates and more preferably in combination with mixtures of hydrophilic and hydrophobic polyisocyanates. These compositions are particularly suitable for coating metallic surfaces or plastics. Curing can take place at room temperature up to 160° C. If the vinyl polymer polyol secondary dispersions according to the invention are employed in combination with amino crosslinking resins, they are suitable for coating metallic surfaces and curing at 100 to 180° C. The coating compositions are applied in the form of one-coat coatings or as top coats.

EXAMPLES

All data in % relate to the weight. All the examples were carried out under an inert gas (nitrogen).

Example A

Amphiphilic Block Polymer Containing Urethane Groups (According to the Invention)

A mixture of 284 g of n-butyl methacrylate, 5.6 g of 2-mercaptoethanol and 500 ml toluene was initially introduced into a 1 liter reactor and heated to an internal temperature of 90° C. under nitrogen. A solution of 0.5 g of azobisisobutyronitrile in 100 ml toluene was uniformly added dropwise to the contents of the reactor over a period of 8 hours. When the polymerization had ended the solvent toluene was distilled off under vacuum. 253 g of a polymer with an OH number of 14 mg KOH/g and a molecular weight $M_n$ of 4,007 g/mol (determined by means of GPC; styrene calibration) was obtained.

66.7 g of this monohydroxy-functional poly-n-butyl methacrylate were initially introduced into 100 g of acetone and dissolved homogeneously. To this solution was added the melt of an isocyanate prepolymer which had been prepared from 500 g of polyethylene glycol monomethyl ether (molecular weight: approx. 5,000 g/mol; OH number: 12.1 mg KOH/g; manufacturer: Fluka) and 181 g of hexamethylene diisocyanate at a temperature of 70° C. in the melt and had been freed from excess diisocyanate on a thin film evaporator. (The isocyanate content of the prepolymer before use with the hydroxyl-containing polybutyl methacrylate was 1.2%).

The reaction mixture was stirred under reflux until the NCO band was no longer detectable in the IR spectrum. The solvent was then distilled off to constant weight. The n-butyl methacrylate/ethylene oxide block polymer formed was very highly viscous at room temperature.

Example 1

Vinyl Polymer Secondary Dispersion (According to the Invention)

11.3 g of block polymer VP ME 1030 (block polymer of polymethyl methacrylate with a molecular weight of 1,000 g/mol and polyethylene oxide with a molecular weight of 3,000 g/mol; Th. Goldschmidt AG) were initially introduced into a 6 liter polymerization tank with a stirrer, two reservoir containers with metering pumps and automatic temperature control together with a mixture of 331 g of n-butyl glycol and 872 g of distilled water. The reaction tank was flushed thoroughly with nitrogen. At the same time the mixture was stirred with an anchor stirrer at 200 rpm. The autoclave was then closed and heated to an internal temperature of 145° C. A monomer mixture of 401.5 g of 2-hydroxyethyl methacrylate, 789.5 g of methyl methacrylate and 564 g of n-butyl acrylate was then weighed into reservoir container I and an initiator mixture of 79 g of di-t-butyl peroxide and 67 g of n-butyl glycol was weighed into reservoir container II.

The monomer mixture from reservoir container I, over a period of 3 hours, and the initiator mixture from reservoir container II, over a period of 5 hours 15 min, uniformly immersed in the reaction tank, were then metered in.

When the monomer feed had ended, the initiator feed was also interrupted for a short time (approx. 30 min) and reservoir container I was filled with a second monomer mixture of 162.4 g of 2-hydroxyethyl methacrylate, 115 g of methyl methacrylate, 83.4 g of n-butyl acrylate and 60.9 g of acrylic acid. This second monomer mixture was metered into the reaction tank over a period of 1 hour 30 min, while the remaining initiator solution was metered in during the 2 hours 15 min still remaining.

When the initiator feed had ended, the mixture was stirred for a further 2 hours and then cooled to 90° C. Thereafter, a neutralization solution of 80.2 g of N-dimethylethanolamine in 1252 g of distilled water was metered into the autoclave over a period of 30 min. The mixture was stirred for 1 hour, during which it was cooled to 40° C. It was then filtered through a filter from Seitz (T 5500) under pressure.

The following physico-chemical characteristic data were obtained:

| | |
|---|---|
| Solids content: | 47.5 wt. % |
| pH: | 8.2 |
| Viscosity at D = 42.2 s$^{-1}$: | 1,566 mPa s |
| Acid number: | 11.6 mg KOH/g of dispersion |
| Average particle diameter*: | 126 nm |
| Film on a glass sheet: | clear, transparent |

(*measured by means of laser correlation spectroscopy, LCS)

A storage stability test was carried out with this polymer dispersion at a temperature of 50° C. over 4 weeks. The following results were obtained:

| | 1st week | 2nd week | 4th week |
|---|---|---|---|
| pH: | 7.8 | 7.7 | 7.3 |
| Viscosity (D = 42.2 s$^{-1}$)[mPa s]: | 840 | 649 | 496 |
| Acid number [mg KOH/g disp.]: | 12.4 | 12.7 | 13.1 |
| Average particle diameter [nm]: | 135 | 146 | 165 |

The good stability of this polymer dispersion according to the invention at 50° C. can be seen from the table.

Example 2

Comparison Example

Example 1 according to the invention was repeated, but without addition of the stabilizing block polymer VP ME 1030.

The following physico-chemical characteristic data were obtained:

| | |
|---|---|
| Solids content: | 48.2 wt. % |
| pH: | 8.1 |
| Viscosity (D = 42.2 s$^{-1}$); | 840 mPa s |
| Acid number: | 11.6 mg KOH/g disp. |
| Average particle diameter (LCS): | 152 nm |

The following results were obtained in the storage stability test (50° C.):

| | 1st week | 2nd week |
|---|---|---|
| pH: | 7.8 | 7.7 |
| Viscosity (D = 42.2 s$^{-1}$)[mPa · s]: | 229 | 112 |
| Acid number [mg KOH/g disp.]: | 13.9 | 15.0 |
| Comment: | — | coagulate formation |

After 3 weeks the polymer dispersion was completely coagulated.

Example 3

Vinyl Polymer Secondary Dispersion (According to the Invention)

Example 1 was repeated using 11.3 g of block polymer VP BE 1030 (block polymer of an n-butyl methacrylate block with a molecular weight of 1,000 g/mol and an ethylene oxide block with a molecular weight of 3,000 g/mol; Th. Goldschmidt AG, Essen) instead of the block polymer VP ME 1030.

The following physico-chemical characteristic data were obtained:

| | |
|---|---|
| Solids content: | 46.4 wt. % |
| pH: | 8.0 |
| Viscosity (D = 42.2 s$^{-1}$): | 1,069 mPa s |
| Acid number: | 11.7 mg KOH/g disp. |
| Average particle diameter (LCS): | 161 nm |
| Film on a glass sheet: | clear, transparent |

The following results were obtained in the 4-week storage stability test (50° C.):

|  | 1st week | 2nd week | 4th week |
|---|---|---|---|
| pH: | 8.0 | 7.7 | 7.5 |
| Viscosity (D = 42.2 s$^{-1}$) (mPa s): | 917 | 830 | 687 |
| Acid number [mg KOH/g disp.]: | 12.1 | 12.8 | 12.8 |
| Aver. particle diameter (LCS) [nm]: | 142 | 144 | 161 |

The good stability of this polyol dispersion can be seen from the comparatively small decrease in the viscosity (−36%) and the pH (from 8.0 to 7.5) and the relatively small increase in the average particle diameter (+26%) and the acid number (from 11.7 to 12.8 mg KOH/g of dispersion) after 4 weeks.

Example 4

Vinyl Polymer Secondary Dispersion (According to the Invention)

Example 1 was repeated using 11.3 g of the block polymer VP MA 1007 (block polymer of a methyl methacrylate block with a molecular weight of 1,000 g/mol and a methacrylic acid block with a molecular weight of 700 g/mol; Th. Goldschmidt AG, Essen) instead of the block polymer VP ME 1030.

The following physico-chemical characteristic data were obtained:

| Solids content: | 48.3 wt. % |
|---|---|
| pH: | 7.7 |
| Viscosity (D = 42.2 s$^{-1}$): | 1,680 mPa s |
| Acid number: | 12.7 mg KOH/g disp. |
| Average particle diameter (LCS): | 146 nm |
| Film on a glass sheet: | clear, transparent |

The following results were obtained in the 4-week storage stability test (50° C.):

|  | 1st week | 2nd week | 4th week |
|---|---|---|---|
| pH: | 7.6 | 7.5 | 7.2 |
| Viscosity (D = 42.2 s$^{-1}$) [mPa s]: | 1,222 | 1,105 | 878 |
| Acid number [mg KOH/g disp.]: | 12.9 | 13.5 | 13.7 |
| Average particle diameter (LCS) [nm]: | 141 | 133 | 166 |

The relatively good stability of this polymer dispersion can be seen from the relatively small decrease in the viscosity (−48%) and the pH (from 7.7 to 7.2) and the relatively small increase in the average particle diameter (+13.7%) and the acid number (from 12.7 to 13.7 mg KOH/g of dispersion) after 4 weeks.

Example 5

Vinyl Polymer Secondary Dispersion (According to the Invention)

Example 3 was repeated using 146 g of triethanolamine as the neutralizing agent instead of N-dimethylethanolamine.

The following physico-chemical characteristic data were obtained:

| Solids content: | 44.4 wt. % |
|---|---|
| pH: | 7.4 |
| Viscosity (D = 42.2 s$^{-1}$): | 802 mPa s |
| Acid number: | 11.1 mg KOH/g disp. |
| Average particle diameter (LCS): | 146 nm |
| Film on a glass sheet: | clear, transparent |

The following results were obtained in the 4-week storage stability test (50° C.):

|  | 1st week | 2nd week | 4th week |
|---|---|---|---|
| pH: | 7.3 | 7.3 | 7.5 |
| Viscosity (D = 42.2 s$^{-1}$) [mPa s]: | 955 | 1,489 | 840 |
| Acid number [mg KOH/g disp.]: | 12.0 | 12.2 | 12.4 |
| Aver. particle diameter (LCS) [nm]: | 171 | 172 | 184 |

The excellent stability of this polymer dispersion can be seen from the relatively small change in the viscosity (+4.7%), the pH (from 7.4 to 7.5), the average particle diameter (+15.7%) and the acid number (from 11.1 to 12.4 mg KOH/g of dispersion) after 4 weeks.

Example 6

Vinyl Polymer Secondary Dispersion (According to the Invention)

Example 1 was repeated using 22.6 g of a 55% solution (in xylene) of the block polymer Tego® EBE 55×(block polymer of an ethylene-butylene block and an ethylene oxide block with molecular weights $M_n$ of approx. 4,000 g/mol for both the hydrophobic block and the hydrophilic block; Tego Chemie, Essen) instead of the block polymer VP ME 1030.

The following physico-chemical characteristic data were obtained:

| Solids content: | 45.4 wt. % |
|---|---|
| pH: | 8.5 |
| Viscosity (D = 42.2 s$^{-1}$): | 1,260 mPa s |
| Acid number: | 12.9 mg KOH/g disp. |
| Average particle diameter (LCS): | 118 nm |
| Film on a glass sheet: | clear, transparent |

The following results were obtained in the 4-week storage stability test (50° C.):

|  | 1st week | 2nd week | 4th week |
|---|---|---|---|
| pH: | 8.2 | 8.0 | 7.8 |
| Viscosity (D = 42.2 s$^{-1}$) [mPa · s]: | 955 | 840 | 650 |
| Acid number [mg KOH/g disp.]: | 12.6 | 12.9 | 13.2 |
| Aver. particle diameter (LCS) [nm]: | 122 | 122 | 136 |

The satisfactory stability of this polymer dispersion can be seen from the relatively small change in the pH (from 8.5 to 7.8), the viscosity (−48.4%), the average particle diameter (+15.3%) and the acid number (from 12.9 to 13.2 mg KOH/g disp.) after 4 weeks.

Example 7

Vinyl Polymer Secondary Dispersion; Reversed Process (According to the Invention)

11.3 g of block polymer VP ME 1030 were initially introduced into a 6 liter polymerization tank with a stirrer, two reservoir containers with metering pumps and automatic temperature control together with a mixture of 331 g of n-butyl glycol and 872 g of distilled water. The reaction tank was flushed thoroughly with nitrogen and at the same time the mixture was stirred with an anchor stirrer at 200 rpm. The tank was then closed and heated to an internal temperature of 145° C. A ("hydrophilic") monomer mixture of 162.4 g of 2-hydroxyethyl methacrylate, 115 g of methyl methacrylate, 83.4 g of n-butyl acrylate and 60.9 g of acrylic acid was then weighed into reservoir container I and an initiator mixture of 79 g of di-t-butyl peroxide and 67 g of n-butyl glycol was weighed into reservoir container II.

The monomer mixture from reservoir container I, over a period of 1 hour 30 min, and the initiator mixture from reservoir container II, over a period of 5 hours 15 min, uniformly immersed in the reaction tank, were then metered in.

When the monomer feed had ended, the initiator feed was also interrupted for a short time (approx. 30 min) and reservoir container I was filled with a second ("hydrophobic") monomer mixture of 401.5 g of 2-hydroxyethyl methacrylate, 789.5 g of methyl methacrylate and 564 g of n-butyl acrylate. This second monomer mixture was metered into the reaction tank over a period of 3 hours, while the remaining initiator solution was metered in during the 3 hours 45 min still remaining.

When the initiator feed had ended, the mixture was stirred for a further 2 hours and then cooled to 90° C. Thereafter, a neutralization solution of 75.2 g of N-dimethylethanolamine in 1,802 g of distilled water was metered into the autoclave over a period of approx 30 min. The mixture was stirred for 1 hour, during which it was cooled to 40° C. It was then filtered through a filter from Seitz (T 5500) under pressure.

The following physico-chemical characteristic data were obtained:

| | |
|---|---|
| Solids content: | 41.6 wt. % |
| pH: | 8.0 |
| Viscosity (D = 42.2 s$^{-1}$); | 1,337 mPa s |
| Acid number: | 11.7 mg KOH/g disp. |
| Average particle diameter (LCS): | 151 nm |

A 4-week storage stability test was carried out with this polymer dispersion at a temperature of 50° C. The following results were obtained:

| | 1st week | 2nd week | 4th week |
|---|---|---|---|
| pH: | 7.9 | 7.6 | 7.5 |
| Viscosity (D = 42.2 s$^1$) [mPa s]: | 916 | 840 | 802 |
| Acid number [mg KOH/g disp.]: | 11.2 | 11.3 | 11.9 |
| Aver. particle diameter (LCS) [nm]: | 153 | 153 | 157 |

The outstanding stability of this polymer dispersion can be seen from the relatively small change in the pH (from 8.0 to 7.5), the viscosity (−40.0%), the average particle diameter (+3.8%) and the acid number (from 11.7 to 11.9 mg KOH/g disp.) after 4 weeks

Example 8

Vinyl Polymer Secondary Dispersion (According to the Invention)

Example 1 was repeated using 22.6 g of the block polymer from example A) instead of the block polymer VP ME 1030.

The following physico-chemical characteristic data were obtained:

| | |
|---|---|
| Solids content: | 44.5 wt. % |
| pH: | 8.0 |
| Viscosity at (D = 42.2 s$^{-1}$): | 933 mPa s |
| Acid number: | 12.7 mg KOH/g disp. |
| Average particle diameter (LCS): | 161 nm |

The following results were obtained in the 3-week storage stability test (50° C.):

| | 1st week | 2nd week | 3rd week |
|---|---|---|---|
| pH: | 7.6 | 7.4 | 7.4 |
| Viscosity (D = 42.2 s$^{-1}$) (mPa s): | 773 | 612 | 305 |
| Acid number (mg KOH/g disp.): | 12.5 | 13.0 | 13.6 |
| Aver. particle diameter (LCS) (nm): | 177 | 183 | 185 |

The good stability of this polymer dispersion according to the invention after storage at 50° C. for 3 weeks can be seen from the table.

Example 9

Vinyl Polymer Secondary Dispersion (According to the Invention)

22.6 g of a 55% solution of the block polymer Tego® EBE 55×(Tego Chemie, Essen) were initially introduced into a 6 liter polymerization tank with a stirrer, two reservoir containers with metering pumps and automatic temperature control together with a mixture of 325 g of n-butyl glycol and 855 g of distilled water. The reaction tank was flushed thoroughly with nitrogen and at the same time the mixture was stirred with an anchor stirrer at 200 rpm. The tank was then closed and heated to an internal temperature of 145° C. A ("hydrophobic") monomer mixture of 485.7 g of 2-hydroxyethyl methacrylate, 204.8 g of methyl methacrylate, 111.7 g of styrene, 73.8 g of n-butyl acrylate, 288.4 g of n-butyl methacrylate and 261.9 g of isobornyl acrylate was then weighed into reservoir container I and an initiator mixture of 71.1 g of di-t-butyl peroxide and 33 g of n-butyl glycol was weighed into reservoir container II.

The monomer mixture from reservoir container I, over a period of 3 hours, and the initiator mixture from reservoir container II, over a period of 5 hours 15 min, uniformly immersed in the reaction tank, were then metered in.

When the monomer feed had ended, the initiator feed was also interrupted for a short time (approx. 30 min) and reservoir container I was filled with a second ("hydrophilic") monomer mixture of 143.6 g of methyl methacrylate, 121.4 g of n-butyl acrylate and 54.8 g of acrylic acid. This second monomer mixture was metered into the reaction tank over a period of 1 hour 30 min, while the remaining initiator solution was metered in during the 2 hours 15 min still remaining.

When the initiator feed had ended, the mixture was after-stirred for a further 2 hours and then cooled to 90° C. Thereafter, a neutralization solution of 67.7 g of N-dimethylethanolamine in 1,830 g of distilled water was metered into the autoclave over a period of approx. 30 min. The mixture was stirred for 1 hour, during which it was cooled to 40° C. It was then filtered through a filter from Seitz (T 5500) under pressure.

The following physico-chemical characteristic data were obtained:

| | |
|---|---|
| Solids content: | 39.9 wt. % |
| pH: | 7.6 |
| Viscosity (D = 42.2 s$^{-1}$): | 611 mPa s |
| Acid number: | 12.1 mg KOH/g disp. |
| Average particle diameter (LCS): | 128 nm |

A one-week storage stability test was carried out with this polymer dispersion at a temperature of 50° C. The following results were obtained:

| | |
|---|---|
| pH: | 7.3 |
| Viscosity (D = 42.2 s$^{-1}$): | 382 mPa s (−37.5%) |
| Acid number [mg KOH/g disp.]: | 11.7 mg KOH/g disp. |
| Average particle diameter (LCS): | 149 nm (+16.4%) |

The stability of this dispersion was satisfactory, as can be seen by comparing the physico-chemical characteristic data before and after the stability test.

Example 10

Comparison Example

A polyacrylate dispersion according to EP-A 0 358 979 (secondary dispersion Bayhydrol® VP LS 2235/1, Bayer AG, Leverkusen) based on the following comonomers: 2-hydroxyethyl methacrylate, acrylic acid, methyl methacrylate and n-butyl acrylate, with a solids content of approx. 46 wt. %, an OH content of 3.3 wt. % based on solid resin, an acid number of 21 mg KOH/g of solid resin, a pH of 8.0 and a viscosity of 800 mPa·s (23° C., measured in a rotary viscometer from Haake at a shear gradient of D=40 s$^{-1}$); neutralizing agent: N-dimethylaminoethanol.

Polyisocyanate 1 (according to DE 19 822 891; Bayhydur® VP LS 2319, Bayer AG, Leverkusen)

A polyisocyanate containing isocyanurate groups and allophanate groups, based on 1,6-diisocyanatohexane, which was hydrophilically modified with polyether groups; isocyanate content: 18.1 wt. %; functionality: 3.8; viscosity: approx. 4,000 mPa·s at a shear gradient D=40 s$^{-1}$.

Use section

In this section two aqueous two-component polyurethane systems were formulated and their use properties during the pot life and film formation were evaluated by comparison.

Components 1 and 2 described in the following table were premixed independently of one another. The numerical data correspond to weight contents in g.

TABLE 1

| | Wt. content [g] | Wt. content [g] |
|---|---|---|
| Component 1 | | |
| Polyol dispersion example 4 | 54.02 | — |
| Polyol dispersion example 10 (comparison example) | — | 52.75 |
| Surfynol ® 104 (50% in butyl glycol, AIR PRODUCTS Europe B.V., NL) | 1.31 | 1.22 |
| Borchigel ® PW 25 (25% in propylene glycol/water, BORCHERS, DE) | 0.17 | 0.16 |
| Baysilone ® VP AI 3468:3466, 3:7 (10% in methoxybutyl acetate, BAYER AG, Leverkusen, DE) | 0.78 | 0.75 |
| Component 2 | | |
| Polyisocyanate I | 17.67 | 16.35 |
| Methoxybutyl acetate | 4.43 | 4.10 |
| Component 3 | | |
| Deionized water | 21.61 | 24.67 |

Components 1 and 2 were dispersed with a dissolver for 1 min at approx. 200 rpm. The dispersion was then diluted with component 3 to obtain a flow time of approx. 22 to 25 s according to DIN 4 results.

During the pot life the viscosities listed in the following table in the form of flow times according to DIN 4 and the following pH values were measured.

TABLE 2

| Two-component system Pot life | Polyol (example 4)/ polyisocyanate 1 | Polyol (example 10)/ polyisocyanate 1 |
|---|---|---|
| | Viscosity (DIN 4, s)/pH | |
| 0 h | 25/7.8 | 22/7.6 |
| 1 h | 20/7.6 | 20/7.6 |
| 2 h | 20/7.3 | 22/7.4 |
| 3 h | 22/7.1 | 28/7.3 |

Directly after components 1–3 had been mixed, films were applied to glass sheets and the properties listed in the following table were measured.

TABLE 3

| Two-component system | Polyol (example 4)/ polyisocyanate 1 | Polyol (example 10)/ polyisocyanate 1 |
|---|---|---|
| Drying after 30', 60° C. | clearly tacky | clearly tacky |
| Drying after 30', 60° C. +2 h, 23° C. | no tackiness | no tackiness |
| Drying according to DIN 53150 | | |
| T1 (sand dry) | 1.5 h | 1.5 h |
| T3 (200 g of touch dry) | >7 h | <7 h |
| Hardness development during film formation according to DIN 53157 (pendulum hardness in s) | | |
| 0 h | 17 | 36 |
| +1 d, 23° C. | 90 | 96 |
| +7 d, 23° C. | 167 | 160 |
| +16 h, 50° C. | 161 | 169 |
| at layer thickness (µm) | (45) | (50) |

Testing in the following coating lacquer build-up: cathodic coating + conventional base coating, 3 spray passes in the block with 10' intermediate evaporation (horizontal) + 20' final evaporation + 30', 60° C. Determination of the resistance to solvents by applications of the following test agents:
1 h water/5' super-grade petrol/ Rating*
5' methoxypropyl acetate/5'

TABLE 3-continued

| Two-component system | Polyol (example 4)/ polyisocyanate 1 | Polyol (example 10)/ polyisocyanate 1 |
|---|---|---|
| xylene | | |
| 0 h | 4 4 5 5 | 4 4 4 5 |
| +1 d, 23° C. | 3 2 3 4 | 2 2 3 3 |
| +7 d, 23° C. | 2 1 1 1 | 1 1 1 1 |
| +16 h, 50° C. | 1 1 1 1 | 1 1 1 1 |
| 1 h alkaline**/1 h acid cleaner*** | Rating* | |
| after 7 d, 23° C. | 0/0 | 0/0 |
| Technical data | | |
| Degree of gloss 20° DIN 67530 | 83 | 86 |
| Gloss, visual | very good | very good |
| Haze DIN 67530 | 24 | 30 |
| Flow, visual | good | satisfactory |
| at layer thickness (μm) | (50) | (60) |

*Rating of the lacquer surface after exposure:
5 = destroyed, 4 = markedly changed, 3 = clearly changed, 2 = slightly changed, 1 = trace of a change, 0 = unchanged
**2% sodium hydroxide solution in demineralized water
***2% sulfuric acid in demineralized water Surprising features of the two-component polyurethane composition of polyol 4/polyisocyanate 1 are, in particular, the longer pot life or processing time compared with the two-component polyurethane combination of polyol 10/polyisocyanate 1, which manifests itself in a slower increase in viscosity (measured as flow times), and the lower haze value and in particular the better flow during film formation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A heat and storage stable vinyl polymer polyol secondary dispersion comprising
   A) at least one vinyl polymer resin having hydroxyl groups and also having functional groups comprising a member selected from the group consisting of carboxyl and sulfonic acid groups and dispersed in a water/solvent mixture in the presence of a neutralizing agent, and
   B) at least one amphiphilic polymer comprising a block polymer of a vinyl polymer as the hydrophobic segment and either polyethylene oxide or poly(meth)acrylic acid as the hydrophilic segment.

2. The vinyl polymer polyol secondary dispersion of claim 1 wherein the dispersion has a solids content of between 30 and 60 wt. % and at a viscosity 100 to 10,000 mPa·s (23° C., shear gradient D=42 s$^{-1}$).

3. The vinyl polymer polyol secondary dispersion of claim 1 wherein polyethylene oxide is present as the hydrophilic segment.

4. The vinyl polymer polyol secondary dispersion of claim 1 wherein poly(meth)acrylic acid is present as the hydrophilic segment.

5. A process for the preparation of the vinyl polymer polyol secondary dispersion of claim 1 which comprises preparing vinyl polymer resin A) by polymerizing a mixture of ethylenically unsaturated monomers a) in the presence of an initiator b) in a water/solvent mixture with the addition of at least one amphiphilic polymer B), and then at least partly neutralizing and dispersing the product, optionally after adding a further amount of water.

6. The process of claim 5 which comprises preparing vinyl polymer resin A) by polymerizing 30 to 80 wt. % of a mixture of ethylenically unsaturated monomers a) in the presence of 0.5 to 8.0 wt. % of an initiator b) in a mixture of 2 to 20 wt. % of an organic solvent c) and 10 to 50 wt. % of water with the addition of 0.1 to 3.0 wt. % of at least one amphiphilic polymer B), wherein the sum of the components is 100 wt. %.

7. The process of claim 5 which comprises preparing vinyl polymer resin A) by polymerizing 35 to 75 wt. % of a mixture of ethylenically unsaturated monomers a) in the presence of 0.5 to 8.0 wt. % of an initiator b) in a mixture of 5 to 15 wt. % of an organic solvent c) and 15 to 40 wt. % of water with the addition of 0.15 to 2.0 wt. % of at least one amphiphilic polymer B), wherein the sum of the components is 100 wt. %.

8. A water-dilutable coating composition comprising as the binder the vinyl polymer polyol secondary dispersions of claim 1.

9. The water-dilutable coating composition of claim 8 which additionally comprises a crosslinking agents.

10. A substrate coated or sealed with the coating composition of claim 9.

11. The substrate of claim 10 wherein the substrate is a metallic surface or a plastic surface.

* * * * *